United States Patent [19]

Koch et al.

[11] 4,187,320
[45] Feb. 5, 1980

[54] PROCESS FOR PREPARING CHEWING GUM BASE USING SOLID ELASTOMER

[75] Inventors: Edwin R. Koch, Garden City; Leonard P. Abbazia, Brooklyn; Wayne J. Puglia, Bellerose Village, all of N.Y.

[73] Assignee: Warner-Lambert Company, Morris Plains, N.J.

[21] Appl. No.: 901,371

[22] Filed: May 1, 1978

[51] Int. Cl.$^2$ .............................................. A23G 3/30
[52] U.S. Cl. ........................................ 426/3; 426/541
[58] Field of Search ................................. 426/3-6, 426/541

[56] References Cited

U.S. PATENT DOCUMENTS

| | | | |
|---|---|---|---|
| 2,489,147 | 11/1949 | Lougovoy | 426/3 |
| 2,635,964 | 4/1953 | Hewitt | 426/3 |
| 3,666,492 | 5/1972 | Teng | 426/3 |
| 3,995,064 | 11/1976 | Ehrgott | 426/3 |

Primary Examiner—Jeanette M. Hunter
Attorney, Agent, or Firm—Albert H. Graddis; George M. Kaplan

[57] ABSTRACT

A two-stage process for the preparation of a chewing gum base utilizing solid elastomer is described wherein the solid elastomer is initially subjected to high intensity mixing under high shear conditions to masticate the solid until a substantially uniform, lump-free mass is obtained; followed by the step-wise addition of an elastomer solvent and an oleaginous plasticizer with continuous high intensity mixing until a substantially molten, uniform mass is obtained. In the second stage of the process, the remaining chewing gum base ingredients are added, step-wise, with continuous high intensity mixing until a uniform blend of ingredients is obtained. The second stage ingredients, which may include a non-toxic vinyl polymer, a hydrophobic plasticizer, additional oleaginous plasticizer and an emulsifier, are added step-wise in a sequence determined by decreasing order of viscosity. In a modification of the process, the hydrophobic plasticizer or emulsifier may be added with the stage one ingredients. Optional ingredients such as antioxidants and fillers may be added during stage one or stage two; and pigments, which are also optional, may be added during the stage two processing.

40 Claims, No Drawings

PROCESS FOR PREPARING CHEWING GUM BASE USING SOLID ELASTOMER

BACKGROUND OF THE INVENTION

1. Field of the Invention

The present invention relates to a two-stage process for the preparation of a chewing gum base utilizing solid elastomer.

2. Description of the Prior Art

In U.S. Pat. No. 3,995,064, there is described a three-step process for the preparation of a chewing gum base utilizing solid elastomer in which the order of mixing and blending ingredients is stated to be critical, particularly with respect to the oleaginous plasticizer and the hydrophobic plasticizer ingredients which cannot be added during mixing under high shear conditions. In the process of aforementioned U.S. Pat. No. 3,995,064, the hydrophobic plasticizer is added during the second step where mixing is conducted under reduced shear conditions and increased folding action; and the oleaginous plasticizer must be added in the third step wherein mixing is conducted under rapid folding action with substantially no shearing.

According to the two-stage process of the subject invention, it has been found that all gum base ingredients may be subjected to high intensity mixing under conditions of high shear. Moreover, the oleaginous plasticizer is a necessary ingredient of the first stage wherein both the elastomer and the elastomer solvent are present.

DESCRIPTION OF THE PARTICULAR EMBODIMENTS

According to the present invention, chewing gum base may be prepared in a two-stage process wherein, in the first stage, solid elastomer is initially subjected to high intensity mixing under high shear conditions to masticate the solid elastomer and obtain a substantially uniform, lump-free mass. An elastomer solvent is then added, step-wise, to the mixer containing the masticated solid elastomer, followed by the step-wise addition of an oleaginous plasticizer. Typically, these last named ingredients are metered into the mixer containing the masticated solid elastomer. The high intensity mixing is conducted during the step-wise addition of both the elastomer solvent and the oleaginous plasticizer and continued after the addition of these ingredients has been completed until a substantially molten, uniform mass is obtained. The effluent from the high intensity mixer of stage one is a rubber compound, completely homogenous, which has no undispersed elastomeric particles and which can be stretched into a translucent film.

Solid elastomers suitable for use in the process of this invention are those normally used in chewing gum base and include synthetic gums or elastomers such as butadiene-styrene copolymer, polyisobutylene and isobutylene-isoprene copolymer; natural gums or elastomers such as chicle, natural rubber, jelutong, balata, guttapercha, lechi caspi, sorva, or mixtures thereof. Among these, butadiene-styrene copolymer, polyisobutylene, isobutylene-isoprene copolymer or mixtures thereof are preferred as the elastomer solid.

As the elastomer solvent, there may be mentioned terpene resins such as polymers of α-pinene or β-pinene; rosin derivatives such as the glycerol ester of polymerized rosin or the glycerol ester of hydrogenated rosin; and mixtures thereof.

The following oleaginous plasticizers are suitable for use in the practice of this invention: hydrogenated vegetable oils, cocoa butter, natural waxes, petroleum waxes such as the polyethylene waxes, and paraffin waxes; or mixtures thereof.

The first stage of the process of the present invention may be conducted without the addition of heat since heat is generated by the high intensity mixing of the solid elastomer. However, it has been found advantageous to apply heat to the mixing kettle initially (by heating the mixing kettle to a temperature range of 88° C.–102° C.) to speed up the process. After the solid elastomer has been mixed for a period of time, heat is built up by the shearing of the elastomer so that the application of heat is no longer necessary and may be discontinued. Cooling is sometimes necessary if too much heat is built up during the shearing of the elastomer. If cooling is applied, it may then be necessary to apply additional heat to prevent the mass from adhereing to the mixer. In any event, maximum temperatures built up during the mixing should not exceed the decomposition temperatures of the ingredients being mixed during a particular stage of processing. The mixing of the stage one ingredients is completed when a substantially molten, uniform mass is obtained.

The sequence of addition of the named ingredients and the high intensity mixing are critical in this first stage.

The second stage in the process of the present invention involves the step-wise addition of the remaining chewing gum base ingredients and additional high intensity mixing under high shear conditions until a uniform blend of ingredients is obtained. The second stage ingredients may include a hydrophobic plasticizer, additional oleaginous plasticizer, a non-toxic vinyl polymer, and an emulsifier. If the process is being performed in a continuous manner, the second step ingredients are added to the molten mass of stage one, step-wise, with continuous high intensity mixing. Typically, the stage two ingredients are metered into the molten mass of stage one, in sequence by decreasing order of viscosity. For example, the hydrophobic plasticizer is added first, followed by the oleaginous plasticizer, the vinyl polymer, and lastly, the emulsifier.

Suitable non-toxic vinyl polymers are those conventionally used in chewing gum base such as polyvinyl acetate or partially hydrolyzed polyvinyl acetate, i.e., polyvinyl alcohol, and mixtures thereof.

As the hydrophobic plasticizer, there may be mentioned alcohol esters of rosin, for example, glycerol esters of hydrogenated rosin, the glycerol esters of partially hydrogenated rosin, or mixtures thereof.

Oleaginous plasticizers mentioned above which are suitable for addition during stage one are also suitable for addition during stage two.

As the emulsifier, lecithin, fatty acid monoglycerides, diglycerides or triglycerides, i.e., glycerol monostearate or propylene glycol monostearate, and mixtures thereof, are suitable for use in the process of this invention.

As has been mentioned, high intensity mixing under conditions of high shear is continued throughout the addition of all stage two ingredients. When the process of the invention is performed in a continuous manner, sufficient heat is applied during stage two to maintain the mass in a molten condition while the ingredients are added.

In the event of batch processing, heat is also applied initially to ensure that the stage one mass is molten before commencement of high intensity mixing and during the addition of the stage two ingredients. In a batch process, the stage one molten mass may be fed into a holding tank, from which a predetermined amount of the molten mass (heated if necessary) is metered into a second high intensity mixer. The stage two ingredients are then added, typically by metering, with continuous high intensity mixing. After all of the stage two ingredients have been added, the high intensity mixing is continued until a uniform blend of all ingredients is obtained.

In an alternative process for preparing the chewing gum base of this invention, certain of the stage two ingredients may be added during stage one. Specifically, the hydrophobic plasticizer (except as specified below) may be added during the stage one processing. Since the above named ingredients for the elastomer solvent and the hydrophobic plasticizer are similar, they may be used interchangeably. The hydrophobic plasticizer may be added during stage one after the addition of the elastomer and the elastomer solvent. In another variation of the process of the invention, the emulsifier is added during stage one processing or partially during both stage one and stage two processing. The emulsifier may be added before or after the addition of the oleaginous plasticizer. In any event, as has been specified above, each ingredient is added step-wise, typically by metering, with continuous high intensity mixing.

For the preparation of certain types of gum base, the nontoxic vinyl polymer normally added during stage two processing may be omitted. In such case, a portion of the hydrophobic plasticizer must be added during the stage two processing.

The addition of optional ingredients such as antioxidants, preservatives, fillers and pigments is also contemplated in the process of this invention. Antioxidants, preservatives and fillers may be added either during stage one or stage two processing; pigments are added during stage two processing. Typically, the antioxidants and preservatives (i.e., butylated hydroxyanisole, butylated hydroxytoluene, propyl gallate and the like) are pre-blended with one of the necessary ingredients prior to the step-wise addition. In a preferred embodiment of this invention, antioxidants and/or preservatives are preblended with the emulsifier and/or the oleaginous plasticizer.

Fillers, including calcium carbonate, magnesium carbonate, talc and the like may be added during stage one or stage two. Preferably, the filler is added during stage two, typically as the first stage two ingredient.

Pigments (i.e., titanium dioxide, copper chlorophyllin, β-carotene, Red no. 3, Blue no. 2 and Yellow no. 6) if included are added during the stage two processing, typically with the filler ingredient.

The above mentioned optional ingredients are added step-wise, with continuous high intensity mixing as previously described for the necessary gum base ingredients.

The various ingredients named above for use in the gum base prepared according to the process of this invention are those conventionally used in the preparation of chewing gum base. They may be present in the following parts by weight, based on the total weight of the chewing gum base composition:

| INGREDIENT | PARTS BY WEIGHT |
|---|---|
| Elastomer | 5–15 |
| Elastomer Solvent | 5–25 |
| Oleaginous Plasticizer | 10–30 |
| Non-toxic Vinyl Polymer | 0–35 |
| Hydrophobic Plasticizer | 5–25 |
| Emulsifier | 2–10 |
| Filler | 0–35 |
| Antioxidant/preservatives | 0–2 |
| Pigments | 0–2 | the oleaginous plasticizer, which comprises from about 10% to about 30% of the total gum base composition, is a necessary ingredient in both stage one and stage two of the process of this invention. Generally, from about 5 to about 15 parts by weight of the oleaginous plasticizer are added during stage one processing and from about 5 to about 15 parts by weight are added during stage two processing.

The foregoing sequence of addition of ingredients, with continuous mixing has been found to be critical to the process of this invention. In contrast to prior art processes, it has been found that the oleaginous plasticizer must be added with the elastomer and elastomer solvent during stage one and subjected to high intensity mixing if a completely homogenous blend of ingredients is to be obtained. Furthermore, as opposed to the prior art processes, it has been found that all remaining gum base ingredients may be added in the second stage of the process and subjected to high intensity mixing to obtain a uniform, substantially lump-free chewing gum base. The two-stage process of the invention is flexible in that it may be performed in a batch or continuous manner. Additionally, the process effectively reduces the time presently required to produce chewing gum base by conventional means using elastomer latex rather than solid elastomer.

The high intensity mixing apparatus suitable for use in the process of this invention provides a high degree of shear on the substances being mixed such that milling action is achieved due to the close tolerances between moving surfaces. The mixers, feeding equipment, blenders and holding tanks used in the process of this invention are conventional in design. They may be jacketed, in a conventional manner, in order that heating or cooling can be applied, when necessary, to maintain the ingredients in the molten state and ensure efficient mixing.

In order to further illustrate the process of this invention, the following examples are provided:

EXAMPLE 1

| | INGREDIENTS | PARTS BY WEIGHT |
|---|---|---|
| 1. | Butadiene-styrene copolymer latex solid | 10 |
| 2. | Glycerol ester of hydrogenated rosin | 18 |
| 3. | Hydrogenated vegetable oil | 11 |
| 4. | Calcium carbonate | 15 |
| 5. | Paraffin wax | 10 |
| 6. | Polyvinyl acetate | 31 |
| 7. | Glycerol monostearate | 5 |

Preheat the high intensity mixer to 88° C.–102° C., add ingredient 1 and commence mixing. Continue to mix for about 20 minutes or until a lump-free mass is obtained. Discontinue heat and add ingredient 2, step-wise, and continue mixing for a period of from 1½ to 2 hours. Add 3, step-wise, and continue mixing for from ½ to ¾ of an hour. Discontinue mixing and transfer the mass to a second high intensity mixer which is jacketed to maintain a temperature of at least 85° C. but no higher than 105° C. Commence mixing, add ingredient 4, step-wise, and continue mixing for approximately 20 minutes. Add ingredients 5, 6 and 7, step-wise, mixing each for at least 15 minutes before the next ingredient addition. When all ingredients have been added, an additional 15 minutes of mixing is sufficient to obtain a homogenous gum base.

EXAMPLE 2

| | INGREDIENTS | PARTS BY WEIGHT |
|---|---|---|
| 1. | Polyisobutylene solid | 11 |
| 2. | Dimerized rosin ester | 10 |
| 3. | Paraffin wax | 13 |
| 4. | Glycerol ester of hydrogenated rosin | 20 |
| 5. | Hydrogenated vegetable oil | 12 |
| 6. | Polyvinyl acetate | 25 |
| 7. | Glycerol monostearate | 9 |

Follow the procedure of Example 1 for ingredients 1, 2 and 3 and transfer the mass to a second high intensity mixer which is jacketed to maintain a temperature of at least 85° C. but no higher than 105° C. Commence mixing and add ingredients 4, 5, 6 and 7, step-wise, mixing each for at least 15 minutes before the next ingredient addition. When all ingredients have been added, an additional 15 minutes of mixing is sufficient to obtain a homogenous gum base.

EXAMPLE 3

| | INGREDIENTS | PARTS BY WEIGHT |
|---|---|---|
| 1. | Butadiene-styrene copolymer latex solid | 10 |
| 2. | Dimerized rosin | 8 |
| 3. | Glycerol esters of hydrogenated rosin | 6 |
| 4. | Lecithin | 1 |
| 5. | Hydrogenated vegetable oil | 11 |
| 6. | Calcium carbonate | 15 |
| 7. | Candelilla wax | 9 |
| 8. | Polyvinyl acetate | 35 |
| 9. | Glycerol monostearate | 5 |

Follow the procedure of Example 1 for ingredients 1, 2 and 3 and add ingredient 4, step-wise, and mix for about 15 minutes; then add ingredient 5 and mix for from ½ to ¾ of an hour. Transfer the mass to a second high intensity mixer, jacketed to maintain a temperature of at least 85° C. but no higher than 105° C. Commence mixing and add ingredient 6, step-wise, and continue mixing for approximately 20 minutes. Add ingredients 7, 8 and 9, step-wise, mixing each at least 15 minutes before the next ingredient addition. When all ingredients have been added, an additional 15 minutes of mixing is sufficient to obtain a homogenous gum base.

EXAMPLE 4

| | INGREDIENTS | PARTS BY WEIGHT |
|---|---|---|
| 1. | Butadiene-styrene copolymer latex solid | 12 |
| 2. | Glycerol ester of hydrogenated rosin | 18 |
| 3. | Paraffin wax | 5 |
| 4. | Calcium carbonate | 25 |
| 5. | Dimerized rosin ester | 30 |
| 6. | Hydrogenated vegetable oil | 5 |
| 7. | Glycerol monostearate | 4.92 |
| 8. | Butylated hydroxy anisole, preblended with a portion of No. 7 | .08 |

Follow the procedure of Example 1 for ingredients 1-4. Add ingredient 5, step-wise, and mix for approximately 30 minutes. Then add ingredients 6, 7 and 8, step-wise, mixing each for at least 15 minutes before the next ingredient addition. When all ingredients have been added, an additional 15 minutes of mixing is sufficient to obtain a homogenous gum base.

EXAMPLE 5

| | INGREDIENTS | PARTS BY WEIGHT |
|---|---|---|
| 1. | Butadiene-styrene | |
| 2. | Dimerized rosin | 10 |
| 3. | Lecithin | 3 |
| 4. | Paraffin wax | 10 |
| 5. | Calcium carbonate | 21 |
| 6. | Glycerol ester of hydrogenated rosin | 10 |
| 7. | Hydrogenated vegetable oil | 10 |
| 8. | Polyvinyl alcohol | 20 |
| 9. | Glycerol monostearate | 5 |

Follow the procedure of Example 1 for ingredients 1 and 2 and add ingredient 3, step-wise, and mix for about 15 minutes; then add ingredient 4 and mix for from ½ to ¾ of an hour. Transfer the mass to a second high intensity mixer, jacketed to maintain a temperature of at least 85° C. but no higher than 105° C. Commence mixing and add ingredient 5, step-wise, and continue mixing for approximately 20 minutes. Add ingredients 6, 7, 8 and 9, step-wise, mixing each at least 15 minutes before the next ingredient addition. When all ingredients have been added, an additional 15 minutes of mixing is sufficient to obtain a homogenous gum base.

We claim:

1. A two-stage process for preparing a chewing gum base using solid elastomer which comprises:

A. a first stage wherein solid elastomer, an elastomer solvent and an oleaginous plasticizer are subjected to high intensity mixing under high shear conditions until a molten, uniform mass is obtained; said solid elastomer being initially subjected to high intensity mixing to masticate said solid elastomer until a uniform, lump-free mass is obtained, followed by the step-wise addition of said elastomer solvent with continuous high intensity mixing, followed by the step-wise addition of said oleaginous plasticizer with continuous high intensity mixing; and B. a second stage wherein a hydrophobic plasticizer, an oleaginous plasticizer, a non-toxic vinyl polymer and an emulsifier are added to the molten, uniform mass of A, said second stage ingredients being added step-wise to the molten, uniform mass of A, with continuous high intensity mixing under high shear conditions; said high intensity mixing being continued until a uniform blend of ingredients is obtained.

2. The process according to claim 1 wherein the process is conducted in a single high intensity mixer in a continuous manner.

3. The process according to claim 1 wherein, in step B, the hydrophobic plasticizer, the oleaginous plasticizer, the vinyl polymer and the emulsifier are added, step-wise to the molten, uniform mass of A in sequence, by decreasing order of viscosity.

4. The process according to claim 3 wherein a predetermined amount of the molten, uniform masss of A is transferred into a second high intensity mixer and the ingredients of step B are added thereto.

5. The process according to claim 4 wherein there is additionally present a filler.

6. The process according to claim 1 wherein, there is present from about 5 to about 15 parts by weight of elastomer, from about 5 to about 25 parts by weight of elastomer solvent, from about 10 to about 30 parts by weight of oleaginous plasticizer, from about 5 to about 25 parts by weight of hydrophobic plasticizer, from about 0 to about 35 parts by weight of vinyl polymer, from about 2 to about 10 parts by weight of emulsifier and from 0 to 35 parts by weight of a filler.

7. The process according to claim 5 wherein there is additionally present an antioxidant/preservative, said antioxidant/preservative being added by preblending with one of the ingredients of A or B.

8. The process according to claim 5 wherein there is additionally present a pigment, said pigment being added during step B processing.

9. The process according to claim 5 wherein said filler is added during step B processing.

10. The process according to claim 6 wherein from about 5 to about 15 parts by weight of oleaginous plasticizer are added during step A processing and from about 5 to about 15 parts by weight of oleaginous plasticizer are added during step B processing.

11. The process according to claim 5 wherein said filler is added during step B processing.

12. A two-stage process for preparing a chewing gum base using solid elastomer which comprises:
A. a first step wherein solid elastomer, an elastomer solvent, a hydrophobic plasticizer, an emulsifier and an oleaginous plasticizer are subjected to high intensity mixing under high shear conditions until a molten, uniform mass is obtained; said solid elastomer being initially subjected to said high intensity mixing to masticate said solid elastomer until a uniform, lump-free mass is obtained, followed by the step-wise addition of said elastomer solvent with continuous high intensity mixing, followed by the step-wise addition of said hydrophobic plasticizer with continuous high intensity mixing; followed by the step-wise addition of said emulsifier with continuous high intensity mixing; followed by the step-wise addition of said oleaginous plasticizer with continuous high intensity mixing; and
B. a second stage wherein an oleaginous plasticizer, a non-toxic vinyl polymer and emulsifier are added to the molten, uniform mass of A; said second stage ingredients being added step-wise to the molten uniform mass of A with continuous high intensity mixing under high shear conditions; said high intensity mixing being continued until a uniform blend of ingredients is obtained.

13. The process to claim 11 wherein the process is conducted in a single high intensity mixer in a continuous manner.

14. The process according to claim 12 wherein, in step B, the oleaginous plasticizer, vinyl polymer and emulsifier are added, step-wise to the molten, uniform mass of A in sequence, by decreasing order of viscosity.

15. The process according to claim 14 wherein a predetermined amount of the molten, uniform mass of A is transferred into a second high intensity mixer and the ingredients of step B are added thereto.

16. The process according to claim 15 wherein there is additionally present a filler.

17. The process according to claim 12 wherein there is present from about 5 to about 15 parts by weight of elastomer, from about 5 to about 25 parts by weight of elastomer solvent, from about 5 to about 25 parts by weight of hydrophobic plasticizer, from about 10 to about 30 parts by weight of oleaginous plasticizer, from about 2 to about 10 parts by weight of emulsifier, from about 0 to about 35 parts by weight of vinyl polymer and from 0 to 35 parts by weight of a filler.

18. The process according to claim 14 wherein there is additionally present an antioxidant/preservative, said antioxidant/preservative being added by preblending with one of the ingredients in A or B.

19. The process according to claim 16 wherein there is additionally present a pigment, said pigment being added during step B processing.

20. The process according to claim 17 wherein from about 5 to about 15 parts by weight of oleaginous plasticizer are added during step A processing and from about 5 to about 15 parts by weight of oleaginous plasticizer are added during step B processing.

21. A two-stage process for preparing a chewing gum base using solid elastomer which comprises:
A. a first stage wherein solid elastomer, an elastomer solvent and an oleaginous plasticizer are subjected to high intensity mixing under high shear conditions until a molten, uniform mass is obtained; said solid elastomer being initially subjected to said high intensity mixing to masticate said solid elastomer until a uniform, lump-free mass is obtained, followed by the step-wise addition of said elastomer solvent with continuous high intensity mixing, followed by the step-wise addition of said oleaginous plasticizer with continuous high intensity mixing; and
B. a second stage wherein a hydrophobic plasticizer, an oleaginous plasticizer and an emulsifier are added to the molten, uniform mass of step A; said second stage ingredients being added step-wise to the molten, uniform mass of A with continuous high intensity mixing under high shear conditions; said high intensity mixing being continued until a uniform blend of ingredients is obtained.

22. The process according to claim 21 wherein the process is conducted in a single high intensity mixer in a continuous manner.

23. The process according to claim 21 wherein, in step B, the hydrophobic plasticizer, oleaginous plasticizer and emulsifier are added, step-wise, to the molten mass of A in sequence, by decreasing order of viscosity.

24. The process according to claim 23 wherein a predetermined amount of the molten, uniform mass of A is transferred into a second high intensity mixer and the ingredients of step B are added thereto.

25. The process according to claim 24 wherein there is additionally present a filler.

26. A process according to claim 21 wherein there is present from about 5 to about 15 parts by weight of elastomer, from about 5 to about 25 parts by weight of elastomer solvent, from about 10 to about 30 parts by weight of oleaginous plasticizer, from about 5 to about 25 parts by weight of hydrophobic plasticizer, from about 2 to about 10 parts by weight of emulsifier and from 0 to 35 parts by weight of a filler.

27. The process according to claim 25 wherein there is additionally present an antioxidant/preservative, said antioxidant/preservative being added by preblending with one of the ingredients in A or B.

28. The process according to claim 25 wherein there is additionally present a pigment, said pigment being added during step B processing.

29. The process according to claim 25 wherein said filler is added during step B processing.

30. The process according to claim 26 wherein from about 5 to about 15 parts by weight of oleaginous plasticizer are added during step A processing and from about 5 to about 15 parts by weight of oleaginous plasticizer are added during step B processing.

31. A two-stage process for preparing a chewing gum base using solid elastomer which comprises:
  A. a first stage wherein solid elastomer, an elastomer solvent, an oleaginous plasticizer and an emulsifier are subjected to high intensity mixing under high shear conditions until a molten, uniform mass is obtained; said solid elastomer being initially subjected to said high intensity mixing to masticate said solid elastomer until a uniform, lump-free mass is obtained, followed by the step-wise addition of said elastomer solvent with continuous high intensity mixing, followed by the step-wise addition of said oleaginous plasticizer with continuous high intensity mixing, followed by the step-wise addition of said emulsifier with continuous high intensity mixing; and
  B. a second stage wherein a hydrophobic plasticizer, an oleaginous plasticizer, a non-toxic vinyl polymer and an emulsifier are added to the molten, uniform mass of A; said second stage ingredients being added step-wise to the molten, uniform mass of A with continuous high intensity mixing under high shear conditions; said high intensity mixing being continued until a uniform blend of ingredients is obtained.

32. The process according to claim 31 wherein the process is conducted in a single high intensity mixer in a continuous manner.

33. The process according to claim 31 wherein, in step B, the hydrophobic plasticizer, oleaginous plasticizer, the vinyl polymers and the emulsifier are added, step-wise, to the molten, uniform mass of A in sequence by decreasing order of viscosity.

34. The process according to claim 33 wherein a predetermined amount of the molten, uniform mass of A is transferred into a second high intensity mixer and the ingredients of step B are added thereto.

35. The process according to claim 34 wherein there is additionally present a filler.

36. The process according to claim 31 wherein there is present from about 5 to about 15 parts by weight of solid elastomer, from about 5 to about 25 parts by weight of elastomer solvent, from about 10 to about 30 parts by weight of oleaginous plasticizer, from about 2 to about 10 parts by weight of emulsifier, from about 5 to about 25 parts by weight of hydrophobic plasticizer, from about 0 to about 35 parts by weight of vinyl polymer and from 0 to about 35 parts by weight of a filler.

37. The process according to claim 35 wherein there is additionally present an antioxidant/preservative, said antioxidant/preservative being added by preblending with one of the ingredients in A or B.

38. The process according to claim 35 wherein there is additionally present a pigment, said pigment being added during step B processing.

39. The process according to claim 35 wherein said filler is added during step B processing.

40. The process according to claim 36 wherein from about 5 to about 15 parts by weight of oleaginous plasticizer are added during step A processing and from about 5 to about 15 parts by weight of oleaginous plasticizer are added during step B processing.

* * * * *